US009634793B2

(12) United States Patent
Zeng et al.

(10) Patent No.: US 9,634,793 B2
(45) Date of Patent: Apr. 25, 2017

(54) OPEN-LOOP LINK ADAPTION ADJUSTING METHOD AND APPARATUS

(71) Applicant: Huawei Technologies Co., Ltd., Shenzhen (CN)

(72) Inventors: Kun Zeng, Shenzhen (CN); Yuan Tian, Shenzhen (CN); Feng Ye, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 124 days.

(21) Appl. No.: 14/622,088

(22) Filed: Feb. 13, 2015

(65) Prior Publication Data

US 2015/0155966 A1  Jun. 4, 2015

Related U.S. Application Data

(63) Continuation of application No. PCT/CN2013/073387, filed on Mar. 28, 2013.

(30) Foreign Application Priority Data

Aug. 15, 2012  (CN) .......................... 2012 1 0290235

(51) Int. Cl.
H04L 1/00 (2006.01)
H04W 72/04 (2009.01)
H04W 28/18 (2009.01)

(52) U.S. Cl.
CPC .......... *H04L 1/0003* (2013.01); *H04L 1/0015* (2013.01); *H04W 72/048* (2013.01); *H04W 28/18* (2013.01)

(58) Field of Classification Search
CPC ..... H04L 1/003; H04L 1/0015; H04W 72/048
(Continued)

(56) References Cited

U.S. PATENT DOCUMENTS

2005/0025254 A1  2/2005  Awad et al.
2005/0186963 A1*  8/2005  VanLaningham ... H04W 52/262
                                                                    455/452.1
(Continued)

FOREIGN PATENT DOCUMENTS

CN  101873194 A  10/2010
CN  102263608 A  11/2011
(Continued)

OTHER PUBLICATIONS

European Search Report in corresponding International No. PCT/CN2013/073387 (Sep. 22, 2015).
(Continued)

*Primary Examiner* — Ronald B Abelson
(74) *Attorney, Agent, or Firm* — Leydig, Voit & Mayer, Ltd.

(57) ABSTRACT

Embodiments of the present invention disclosed an open-loop link adaptation adjusting method and apparatus, firstly, classifying, by a base station, states of a user equipment during an information transmission process, and configuring an open-loop link adaptation adjusting OLLA value for each of the classified states respectively; then, determining, by the base station, a current state of the user equipment, and selecting an OLLA value corresponding to the current state of the user equipment from the OLLA values corresponding to each of the states respectively; and finally, after adjusting a modulation and coding scheme MCS value according to the OLLA value corresponding to the current state of the user equipment, modifying, by the base station, the OLLA value corresponding to the current state of the user equipment. The present invention is applicable to the communication system field.

10 Claims, 3 Drawing Sheets

(58) Field of Classification Search
USPC .................................................. 370/328, 329
See application file for complete search history.

(56) References Cited

U.S. PATENT DOCUMENTS

2007/0066242 A1   3/2007   Yi et al.
2011/0235604 A1   9/2011   Inoue et al.

FOREIGN PATENT DOCUMENTS

| CN | 102835149 A | 12/2012 |
| EP | 2667533 A1 | 11/2013 |
| WO | WO 2010026287 A1 | 3/2010 |
| WO | WO 2011032274 A1 | 3/2011 |
| WO | WO 2012045143 A1 | 4/2012 |
| WO | WO 2012089172 A1 | 7/2012 |

OTHER PUBLICATIONS

International Search Report in corresponding International No. PCT/CN2013/073387 (Jul. 11, 2013).
Written Opinion in corresponding International No. PCT/CN2013/073387 (Jul. 11, 2013).
$1^{st}$ Office Action in cognate Chinese Patent Application No. 201210290235 (Sep. 5, 2016).

* cited by examiner

OPEN-LOOP LINK ADAPTION ADJUSTING METHOD AND APPARATUS

CROSS-REFERENCE TO RELATED APPLICATIONS

This application is a continuation of International Patent Application No. PCT/CN2013/073387, filed on Mar. 28, 2013, which claims priority to Chinese Patent Application No. 201210290235.X, filed on Aug. 15, 2012, both of which are hereby incorporated by reference in their entireties.

TECHNICAL FIELD

The present invention relates to the field of communication system and, in particular, to an open-loop link adaptation adjusting method and an apparatus.

BACKGROUND

Link adaptation technique is a technique aiming at overcoming a time-variation characteristic of a wireless channel and improving system performance. Its main advantage is capable of improving reliability of a communication link, increasing efficient use of power resources and frequency, and improving system quality of service and transmission capacity.

In LTE (Long Term Evolution, long term evolution) and subsequent evolution systems, AMC (Adaptive Modulation and Coding, adaptive modulation and coding) is a very important link adaptation method. However, measurement errors existing in actual system environment make the AMC unable to accurately track channel variation and acquire channel state, resulting in that a selected modulation and coding mode (which is usually represented by using MCS (Modulation and Coding Scheme, modulation and coding scheme) value) is not matched with the actual channel transmission environment. When the selected MCS value is lower than a channel-tolerable MCS value (defined as an MCS value when a channel sends information to the utmost), it indicates that channel resources are not fully utilized; whereas when the selected MCS value is higher than the channel-tolerable MCS value, the probability of transmission errors will be increased, resulting in a retransmission, which causes a waste of system power and frequency resources.

Regarding this problem, currently, a technique—OLLA (Open Loop Link Adaptation, open loop link adaptation) is used, wherein a reasonable correction is performed to the MCS value selected by the AMC based on HARQ (Hybrid Automatic Repeat Request, hybrid automatic repeat request) information fed back by a user equipment, system measurement errors will result in an error between the MCS value used in the AMC and the channel-tolerable MCS value, the error can be adjusted by setting a correction amount, and the size of the correction amount is referred to as an OLLA value. During the transmission process, the system will continually adjust the OLLA value. However, the prior art does not distinguish different states of the user equipment when the OLLA value is adjusted, so that the OLLA value corresponding to the MCS value during information transmission process of the user equipment in different states cannot be acquired efficiently, resulting in a relatively large error in the OLLA value corresponding to the MCS value acquired by the system, and affecting transmission performance of the system.

SUMMARY

Embodiments of the present invention provide an open-loop link adaptation adjusting method and apparatus, which reduces error in an OLLA value corresponding to an MCS value acquired by a system, and improves transmission performance of the communication system.

Technical solutions employed by the embodiments of the present invention are:

an open-loop link adaptation adjusting method, including:

classifying, by a base station, states of a user equipment during an information transmission process;

configuring, by the base station, an open-loop link adaptation adjusting OLLA value for each of the classified states corresponding to the user equipment respectively;

determining, by the base station, a current state of the user equipment during an information transmission process, and selecting an OLLA value corresponding to the current state of the user equipment from the OLLA values corresponding to each of the states respectively;

adjusting, by the base station, a modulation and coding scheme MCS value according to the OLLA value corresponding to the current state of the user equipment, and then modifying the OLLA value corresponding to the current state of the user equipment.

The method specifically includes:

classifying, by the base station, the states of the user equipment during the information transmission process according to at least one classification condition of a rank of the user equipment, a number of layers of the user equipment during the transmission process, a total number of layers of the user equipment configured by the base station during the transmission process, and a preset state of the user equipment in a system;

when the classification condition is the rank of the user equipment, classifying, by the base station, the states of the user equipment during the information transmission process according to different values of the rank of the user equipment;

when the classification condition is the number of layers of the user equipment during the transmission process, classifying, by the base station, the states of the user equipment during the information transmission process according to different values of the number of layers to which the user equipment is scheduled;

when the classification condition is the total number of layers of the equipment configured by the base station during the transmission process, classifying, by the base station, the states of the user equipment during the information transmission process according to different values of the total number of layers of the user equipment configured by the base station;

when the preset state is whether the user equipment is in a modulo state in a non-linear precoding communication system, dividing, by the base station, the states of the user equipment into two states wherein a current modulo indicator of the user equipment is modulo and a current modulo indicator of the user equipment is non-modulo;

when the preset state is a speed at which the user equipment moves, classifying, by the base station, the states of the user equipment during the information transmission process by presetting different speed thresholds.

An open-loop link adaptation adjusting apparatus, including:

a classification unit, which is configured to classify states of a user equipment during an information transmission process;

a configuration unit, which is configured to configure an open-loop link adaptation adjusting OLLA value for each of the classified states corresponding to the user equipment respectively;

a determination unit, which is configured to determine a current state of the user equipment during the information transmission process;

a selection unit, which is configured to select an OLLA value corresponding to the current state of the user equipment from the OLLA values corresponding to each of the states respectively;

an adjusting unit, which is configured to adjust a modulation and coding scheme MCS value according to the OLLA value corresponding to the current state of the user equipment; and an updating unit, which is configured to modify the OLLA value corresponding to the current state of the user equipment.

The classification unit is specifically configured to classify the states of the user equipment during the information transmission process according to at least one classification condition of a rank of the user equipment, a number of layers of the user equipment during the transmission process, a total number of layers of the user equipment configured by the base station during the transmission process and a preset state of the user equipment in a system;

the classification unit is further configured to classify the states of the user equipment during the information transmission process according to different values of the rank of the user equipment;

the classification unit is further configured to classify the states of the user equipment during the information transmission process according to different values of the number of layers to which the user equipment is scheduled;

the classification unit is specifically further configured to classify the states of the user equipment during the information transmission process according to different values of the total number of layers of the user equipment configured by the base station.

the classification unit is further configured to, when the preset state is whether the user equipment needs a modulo operation in a non-linear precoding communication system, divide the states of the user equipment into two states wherein a current modulo indicator of the user equipment is modulo and a current modulo indicator of the user equipment is non-modulo;

the classification unit is further configured to, when the preset state is a speed at which the user equipment moves, classify the states of the user equipment during the information transmission process by presetting different speed thresholds.

In the open-loop link adaptation adjusting method and apparatus provided by embodiments of the present invention, firstly, a base station classifies states of a user equipment during an information transmission process, and configures an open-loop link adaptation adjusting value OLLA value for each of the classified states corresponding to the user equipment respectively; then, the base station determines a current state of the user equipment during the information transmission process, and selects an OLLA value corresponding to the current state of the user equipment from OLLA values corresponding to each of the states respectively; and finally, after adjusting a modulation and coding scheme MCS value according to the OLLA value corresponding to the current state of the user equipment, the base station modifies the OLLA value corresponding to the current state of the user equipment. The prior art does not distinguish different states of the user equipment when adjusting the OLLA value, so that the OLLA value corresponding to the MCS value during information transmission process of different sates of the user equipment cannot be acquired efficiently, resulting in a relatively large error in the OLLA value corresponding to the MCS value acquired by the system, and affecting transmission performance of the system. According to the present invention, by means of acquiring OLLA values corresponding to different states of a user equipment respectively, error in an OLLA value corresponding to an acquired MCS value is reduced, and transmission performance of a system is improved.

BRIEF DESCRIPTION OF DRAWINGS

In order to make technical solutions in embodiments of the present invention more clearly, accompanying drawings used in the description of the embodiments or the prior art will be briefly described hereunder. Obviously, the described drawings below are merely some embodiments of present invention. For persons skilled in the art, other drawings may be obtained based on these drawings without any inventive efforts.

DESCRIPTION OF EMBODIMENTS

Technical solutions in embodiments of the present invention are hereinafter described clearly and completely with reference to accompanying drawings in the embodiments of the present invention. Obviously, the described embodiments are only a part of embodiments of the present invention, rather than all embodiments of the present invention. All other embodiments obtained by persons of ordinary skill in the art based on embodiments of the present invention without any inventive efforts shall fall within the protection scope of the present invention.

In order to make advantages of technical solutions in the present invention more clearly, the present invention are described hereunder in detail with reference to the drawings and embodiments.

Figure 1:
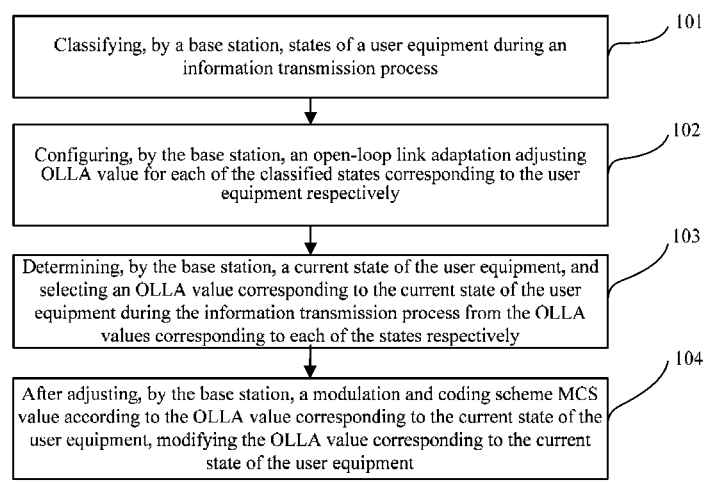
FIG. 1 is a flow chart of an open-loop link adaptation adjusting method according to an embodiment of the present invention.

This embodiment provides an open-loop link adaptation adjusting method, as shown in FIG. 1, the method includes:

101, classifying, by a base station, states of a user equipment during an information transmission process.

The base station can classify the states of the user equipment during the information transmission process according to at least one classification condition of a rank of the user equipment, a number of layers of the user equipment during the transmission process, a total number of layers of the user equipment configured by the base station during the transmission process, and a preset state of the user equipment in a system.

Specifically, the base station classifies the states of the user equipment during the information transmission process according to different values of the rank of the user equipment. For example, assuming that a maximum rank of the user equipment is 2, then the user equipment has two states: a current rank of the user equipment is 1 and a current rank of the user equipment is 2, the total number of states of the user equipment is 2; the base station sets an OLLA value for the state where the rank of the user equipment is 1 and the state where the rank of the user equipment is 2, respectively. The base station can set more OLLA values, but at least two OLLA values are set for each user equipment.

Alternatively, the base station classifies the states of the user equipment during the information transmission process according to different values of the number of layers to which the user equipment is scheduled. For example, maximum number of paired layers allowable is 4 layers when a user equipment UE being scheduled, the UE includes 4 kinds of state: the UE being scheduled to layer 1, the UE being scheduled to layer 2, the UE being scheduled to layer 3 and the UE being scheduled to layer 4, a total number of classification state of the UE equals to 4; a base station eNB sets an OLLA value for the state when the UE is scheduled to layer 1, the state when the UE is scheduled to layer 2, the state when the UE is scheduled to layer 3 and the state when the UE is scheduled to layer 4, respectively, wherein, the base station eNB can set more OLLA values, but at least four OLLA values are set for each UE.

Alternatively, the base station classifies the states of the user equipment during the information transmission process according to different values of the total number of layers of the user equipment configured by the base station. For example, maximum number of allowable paired layers is 4 when the UE being scheduled, then the UE includes 4 kinds of state: the total number of configured layers of the UE is 1 when the UE being scheduled, the total number of configured layers of the UE is 2 when the UE being scheduled, the total number of configured layers of the UE is 3 when the UE being scheduled and the total number of configured layers of the UE is 4 when the UE being scheduled, the total number of the classification state of the UE equals to 4; an eNB sets an OLLA value for the state when the total number of configured layers is 1 when the UE being configured, the state when the total number of configured layers is 2 when the UE being scheduled, the state when the total number of configured layers is 3 when the UE being scheduled and the state when the total number of configured layers is 4 when the UE being scheduled, respectively, wherein, the eNB can set more OLLA values, but at least four OLLA values are set for each UE.

Alternatively, when the preset state is whether the user equipment needs a modulo operation in a non-linear precoding communication system, the base station divides the states of the user equipment into two states wherein a current modulo indicator of the user equipment is modulo and a current modulo indicator of the user equipment is non-modulo.

Alternatively, when the preset state is a speed at which the user equipment moves, the base station classifies the states of the user equipment during the information transmission process by presetting different speed thresholds. For example, a moving speed x of a user equipment is taken as a classification basis, wherein the states of the user equipment during the information transmission process are divided into a low speed state (x<a km/h), a medium speed state (a<=x<b km/h), and a high speed state (x>b km/h). The present invention includes, but is not limited to, two preset speed thresholds.

Alternatively, the base station can also classify the states of the user equipment according to a combination of classification conditions.

Specifically, the eNB classifies the states of the UE according to the number of layer to which the UE is scheduled and the total number of configured layers when the UE is scheduled. For example, if maximum number of allowable paired layers is 4 layers when the UE is scheduled, the UE includes ten kinds of state, respectively are: the UE being scheduled to layer 1 when the total number of configured layers of the UE is 1, the UE being scheduled to layer 1 when the total number of configured layers of the UE is 2, the UE being scheduled to layer 2 when the total number of configured layers of the UE is 2, the UE being scheduled to layer 1 when the total number of configured layers of the UE is 3, the UE being scheduled to layer 2 when the total number of configured layers of the UE is 3, the UE being scheduled to layer 3 when the total number of configured layers of the UE is 3, the UE being scheduled to layer 1 when the total number of configured layers of the UE is 4, the UE being scheduled to layer 2 when the total number of configured layers of the UE is 4, the UE being scheduled to layer 3 when the total number of configured layers of the UE is 4, the UE being scheduled to layer 4 when the total number of configured layers of the UE is 4, the total number of the classification states of the UE equals to 10. The eNB sets an OLLA value for the ten kinds of state respectively, wherein the eNB can set more OLLA values, but at least ten OLLA values are set for each UE.

102, configuring, by the base station, an open-loop link adaptation adjusting OLLA value for each of the classified states corresponding to the user equipment respectively.

103, determining, by the base station, a current state of the user equipment during the information transmission process, and selecting an OLLA value corresponding to the current state of the user equipment from the OLLA values corresponding to each of the states respectively.

104, adjusting, by the base station, a modulation and coding scheme MCS value according to the OLLA value corresponding to the current state of the user equipment, and then modifying, by the base station, the OLLA value corresponding to the current state of the user equipment.

Specifically, the base station adjusts the MCS value according to the OLLA value corresponding to the current state of the user equipment, and then sends a data packet to the user equipment; then the base station updates the OLLA value according to received acknowledgement (ACK)/negative acknowledgement (NACK) feedback information of the data packet; and finally, the base station saves the updated OLLA value for transmission the data packet next time.

According to the method provided in this embodiment, by means of acquiring OLLA values corresponding to different states of a user equipment respectively and adjusting a modulation and coding scheme MCS value according to an OLLA value corresponding to a current state of the user equipment, error in the OLLA value corresponding to the acquired MCS value is reduced, and transmission performance of a communication system is improved.

Figure 2:
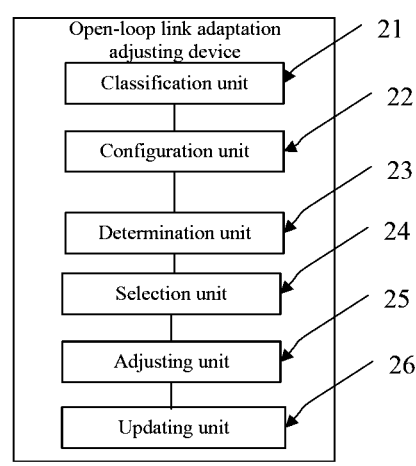
FIG. 2 is a schematic structural diagram of an open-loop link adaptation adjusting apparatus according to an embodiment of the present invention.

The embodiment provides an open-loop link adaptation adjusting apparatus, as shown in FIG. 2, the apparatus includes: a classification unit 21, a configuration unit 22, a determination unit 23, a selection unit 24, an adjusting unit 25 and an updating unit 26.

The classification unit 21 can be configured to classify states of a user equipment during an information transmission process.

The classification unit 21 can be specifically configured to classify the states of the user equipment during the information transmission process according to at least one classification condition of a rank of the user equipment, a number of layers of the user equipment during the transmission process, a total number of layers of the user equipment configured by the base station during the transmission process and a preset state of the user equipment in a system.

The classification unit 21 can be further configured to classify the states of the user equipment during the information transmission process according to different values of the rank of the user equipment.

The classification unit 21 can be further configured to classify the states of the user equipment during the information transmission process according to different values of the number of layers to which the user equipment is scheduled.

The classification unit 21 can be further configured to classify the states of the user equipment during the information transmission process according to different values of the total number of layers of the user equipment configured by the base station.

The classification unit 21 can be further configured to, when the preset state is whether the user equipment is in a modulo state in a non-linear precoding communication system, divide the states of the user equipment into two states wherein a current modulo indicator of the user equipment is modulo and a current modulo indicator of the user equipment is non-modulo.

The classification unit 21 can be further configured to, when the preset state is a speed at which the user equipment moves, classify the states of the user equipment during the information transmission process by presetting different speed thresholds.

The configuration unit 22 can be configured to configure an open-loop link adaptation adjusting OLLA value for each of the classified states corresponding to the user equipment respectively.

The determination unit 23 can be configured to determine a current state of the user equipment during the information transmission process.

The selection unit 24 can be configured to select an OLLA value corresponding to the current state of the user equipment from the OLLA values corresponding to each of the states respectively.

The adjusting unit 25 can be configured to adjust a modulation and coding scheme MCS value according to the OLLA value corresponding to the current state of the user equipment.

The updating unit 26 can be configured to modify the OLLA value corresponding to the current state of the user equipment.

Figure 3:
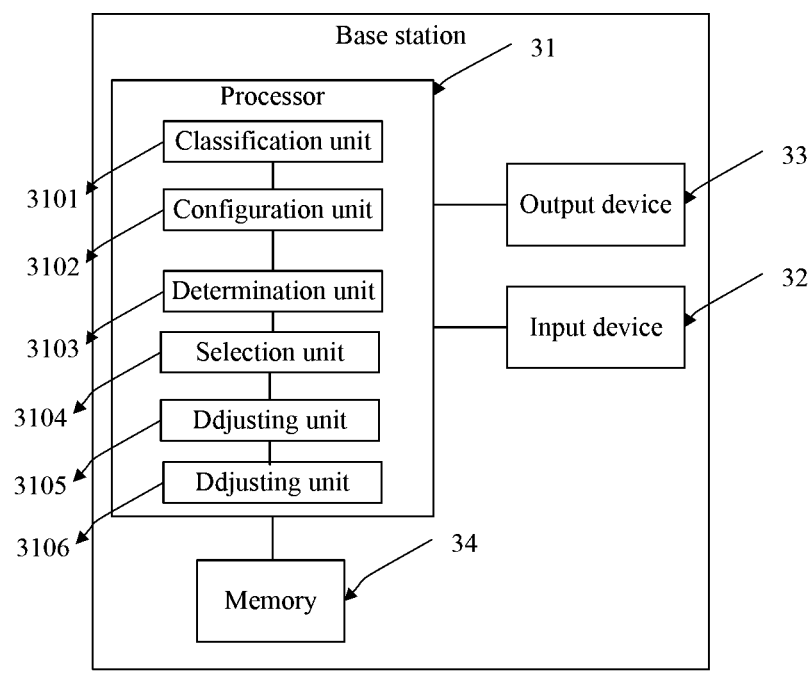
FIG. 3 is a schematic structural diagram of a base station according to an embodiment of the present invention.

An entity of the open-loop link adaptation adjusting apparatus provided by this embodiment can be a base station, as shown in FIG. 3, the base station includes: a central processing unit 31, an input device 32, an output device 33, a memory 34. The input device 32, the output device 33 and the memory 34 are connected to the central processing unit 31.

The central processing unit 31 can specifically include: a classification unit 3101, a configuration unit 3102, a determination unit 3103, a selection unit 3104, an adjusting unit 3105, and an updating unit 3106.

The classification unit 3101 can be configured to classify states of a user equipment during an information transmission process.

The classification unit 3101 can be specifically configured to classify the states of the user equipment during the information transmission process according to at least one classification condition of rank of the user equipment, a number of layers of the user equipment during the transmission process, a total number of layers of the user equipment configured by the base station during the transmission process and a preset state of the user equipment in a system.

The classification unit 3101 can be further configured to classify the states of the user equipment during the information transmission process according to different values of the rank of the user equipment.

The classification unit 3101 can be further configured to classify the states of the user equipment during the information transmission process according to different values of the number of layers to which the user equipment is scheduled.

The classification unit 3101 can be further configured to classify the states of the user equipment during the information transmission process according to different values of the total number of layers of the user equipment configured by the base station.

The classification unit 3101 can be further configured to, when the preset state is whether the user equipment is in a modulo state in a non-linear precoding communication system, divide the states of the user equipment into two states wherein a current modulo indicator of the user equipment is modulo and a current modulo indicator of the user equipment is non-modulo.

The classification unit 3101 can be further configured to, when the preset state is a speed at which the user equipment moves, classify the states of the user equipment during the information transmission process by presetting different speed thresholds.

The configuration unit 3102 can be configured to configure an open-loop link adaptation adjusting OLLA value for each of the classified states corresponding to the user equipment respectively.

The determination unit 3103 can be configured to determine a current state of the user equipment during the information transmission process.

The selection unit 3104 can be configured to select an OLLA value corresponding to the current state of the user equipment from the OLLA values corresponding to each of the states respectively.

The adjusting unit 3105 can be configured to adjust a modulation and coding scheme MCS value according to the OLLA value corresponding to the current state of the user equipment.

The updating unit 3106 can be configured to modify the OLLA value corresponding to the current state of the user equipment.

According to the apparatus provided in this embodiment, by means of acquiring OLLA values corresponding to different states of a user equipment respectively and adjusting a modulation and coding scheme MCS value according to an OLLA value corresponding to a current state of the user equipment, error in the OLLA value corresponding to the acquired MCS value is reduced, and transmission performance of a communication system is improved.

The open-loop link adaptation adjusting apparatus provided by embodiments of the present invention can implement the method embodiments provided above. Reference may be made to description in the method embodiments for specific function implementations, which will not be repeated herein. The open-loop link adaptation adjusting method and apparatus provided by embodiments of the present invention can be applicable to the communication system field, but is not limited thereto only.

Persons of ordinary skill in the art may understand that, all or a part of the procedures of the foregoing method embodiments may be implemented by a computer program instructing relevant hardware. The program may be stored in a computer readable storage medium. When the program runs, the procedures of the foregoing method embodiments may be included. The storage medium may be a magnetic disk, an optical disc, a read-only memory (Read-Only Memory, ROM), or a random access memory (Random Access Memory, RAM, etc.

The above descriptions are merely specific implementations of the present invention, but the protection scope of the present invention is not limited thereto. Any variations or replacements that can be easily derived by those skilled in the art shall fall within the protection scope of the present invention. Therefore, the protection scope of the present invention should be subject to the protection scope of the claims.

What is claimed is:

1. An open-loop link adaptation adjusting method, characterized by comprising:
   classifying, by a base station, states of a user equipment during an information transmission process;
   configuring, by the base station, an open-loop link adaptation adjusting (OLLA) value for each of the classified states corresponding to the user equipment respectively;
   determining, by the base station, a current state of the user equipment during the information transmission process, and selecting an OLLA value corresponding to the current state of the user equipment from the OLLA values corresponding to each of the states respectively; and
   adjusting, by the base station, a modulation and coding scheme (MCS) value according to the OLLA value corresponding to the current state of the user equipment, and then modifying the OLLA value corresponding to the current state of the user equipment;
   wherein the classifying, by the base station, the states of the user equipment during the information transmission process comprises: classifying, by the base station, the states of the user equipment during the information transmission process according to at least one classification condition of a rank of the user equipment, a number of layers of the user equipment during the transmission process, a total number of layers of the user equipment configured by the base station during the transmission process, and a preset state of the user equipment in a system.

2. The open-loop link adaptation adjusting method according to claim 1, wherein, when the classification condition is the rank of the user equipment, the classifying, by the base station, the states of the user equipment during the information transmission process comprises:
   classifying, by the base station, the states of the user equipment during the information transmission process according to different values of the rank of the user equipment.

3. The open-loop link adaptation adjusting method according to claim 1, wherein, when the classification condition is the number of layers of the user equipment during the transmission process, the classifying, by the base station, the states of the user equipment during the information transmission process comprises:
   classifying, by the base station, the states of the user equipment during the information transmission process according to different values of the number of layers to which the user equipment is scheduled.

4. The open-loop link adaptation adjusting method according to claim 1, wherein, when the classification condition is the total number of layers of the equipment configured by the base station during the transmission process, the classifying, by the base station, the states of the user equipment during the information transmission process comprises:
   classifying, by the base station, the states of the user equipment during the information transmission process according to different values of the total number of layers of the user equipment configured by the base station.

5. The open-loop link adaptation adjusting method according to claim 1, wherein, when the classification condition is the preset state of the user equipment in the system, the classifying, by the base station, the states of the user equipment during the information transmission process comprises:
   when the preset state is whether the user equipment is in a modulo state in a non-linear precoding communication system, dividing, by the base station, the states of the user equipment into two states wherein a current modulo indicator of the user equipment is modulo and a current modulo indicator of the user equipment is non-modulo;
   when the preset state is a speed at which the user equipment moves, classifying, by the base station, the states of the user equipment during the information transmission process by presetting different speed thresholds.

6. An open-loop link adaptation adjusting apparatus, characterized by, comprising:
   a classification unit, which is configured to classify states of a user equipment during an information transmission process;
   a configuration unit, which is configured to configure an open-loop link adaptation adjusting (OLLA) value for each of the states classified by the classification unit corresponding to the user equipment respectively;
   a determination unit, which is configured to determine a current state of the user equipment during the information transmission process;
   a selection unit, which is configured to select an OLLA value corresponding to the current state of the user equipment determined by the determination unit from the OLLA values corresponding to each of the states respectively;
   an adjusting unit, which is configured to adjust a modulation and coding scheme (MCS) value according to the OLLA value selected by the selection unit corresponding to the current state of the user equipment; and
   an updating unit, which is configured to modify the OLLA value corresponding to the current state of the user equipment;
   wherein the classification unit is specifically configured to classify the states of the user equipment during the information transmission process according to at least one classification condition of a rank of the user equipment, a number of layers of the user equipment during the transmission process, a total number of layers of the user equipment configured by the base station during the transmission process and a preset state of the user equipment in a system.

7. The open-loop link adaptation adjusting apparatus according to claim 6, wherein,
   the classification unit is configured to classify the states of the user equipment during the information transmission process according to different values of the rank of the user equipment.

8. The open-loop link adaptation adjusting apparatus according to claim 6, wherein,
the classification unit is configured to classify the states of the user equipment during the information transmission process according to different values of the number of layers to which the user equipment is scheduled.

9. The open-loop link adaptation adjusting apparatus according to claim 6, wherein,
the classification unit is specifically configured to classify the states of the user equipment during the information transmission process according to different values of the total number of layers of the user equipment configured by the base station.

10. The open-loop link adaptation adjusting apparatus according to claim 6, wherein,
the classification unit is configured to, when the preset state is whether the user equipment needs a modulo operation in a non-linear precoding communication system, divide the states of the user equipment into two states wherein a current modulo indicator of the user equipment is modulo and a current modulo indicator of the user equipment is non-modulo;
the classification unit is configured to, when the preset state is a speed at which the user equipment moves, classify the states of the user equipment during the information transmission process by presetting different speed thresholds.

* * * * *